(12) United States Patent
Tamura et al.

(10) Patent No.: US 7,539,367 B2
(45) Date of Patent: May 26, 2009

(54) OPTICAL SYSTEM CONNECTION STRUCTURE, OPTICAL COMPONENT, AND OPTICAL COMMUNICATION MODULE

(75) Inventors: Kenichi Tamura, Hitachi (JP); Yoshiaki Ishigami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/010,078

(22) Filed: Jan. 18, 2008

(65) Prior Publication Data

US 2008/0226228 A1  Sep. 18, 2008

(30) Foreign Application Priority Data

Mar. 15, 2007  (JP) .............. 2007-066922

(51) Int. Cl.
*G02B 6/12* (2006.01)

(52) U.S. Cl. .......................... 385/14

(58) Field of Classification Search ............. 385/92–94, 385/14
See application file for complete search history.

(56) References Cited

U.S. PATENT DOCUMENTS

| 6,385,374 | B2* | 5/2002 | Kropp | 385/47 |
| 6,722,793 | B2* | 4/2004 | Althaus et al. | 385/92 |
| 6,887,101 | B2 | 5/2005 | Ito et al. | |
| 6,939,058 | B2* | 9/2005 | Gurevich et al. | 385/93 |
| 2005/0191057 | A1* | 9/2005 | Nakamoto et al. | 398/135 |
| 2005/0238279 | A1* | 10/2005 | Fukuyama et al. | 385/14 |
| 2005/0281507 | A1* | 12/2005 | Kropp | 385/31 |
| 2006/0274997 | A1 | 12/2006 | Furuno et al. | |

FOREIGN PATENT DOCUMENTS

| JP | 2004-355894 | | 12/2004 |
| JP | WO/2005/078495 | * | 8/2005 |
| JP | 2005-331702 | | 12/2005 |
| JP | 2006-309113 | | 11/2006 |

* cited by examiner

*Primary Examiner*—Charlie Peng
(74) *Attorney, Agent, or Firm*—McGinn IP Law Group, PLLC

(57) ABSTRACT

An optical system connection structure, includes a ferrule, an optical fiber inserted into the ferrule, an optical component which converts light paths of a first optical signal outputted from the optical fiber and a second optical signal which has a wavelength different from the first optical signal and is inputted into the optical fiber, at least two inclined surfaces formed in the optical component in which the inclined surfaces inclines regarding a light axis of the optical fiber, an optical filter which transmits or reflects the first optical signal, which reflects or transmits the second optical signal, and which is formed in one of the inclined surfaces, a reflection surface which reflects the first optical signal or the second optical signal and which is formed in one of the inclined surfaces, and a lens formed in a fiber side end face of the optical component facing the ferrule.

6 Claims, 6 Drawing Sheets

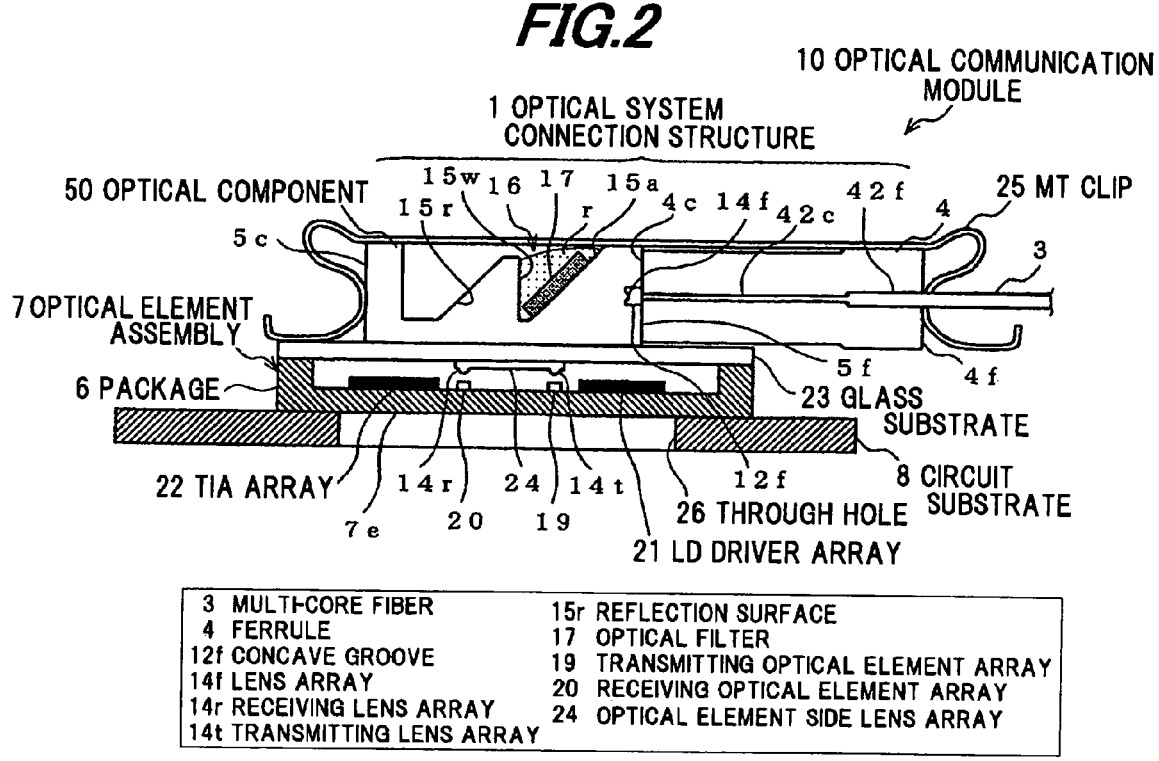
FIG.2
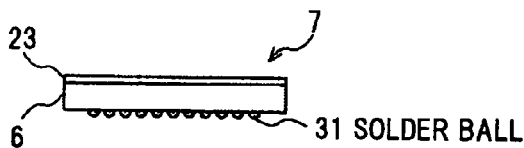
FIG.3A
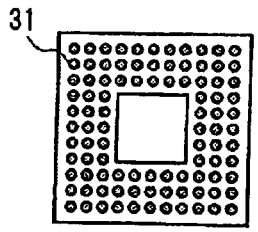
FIG.3B
FIG.3C

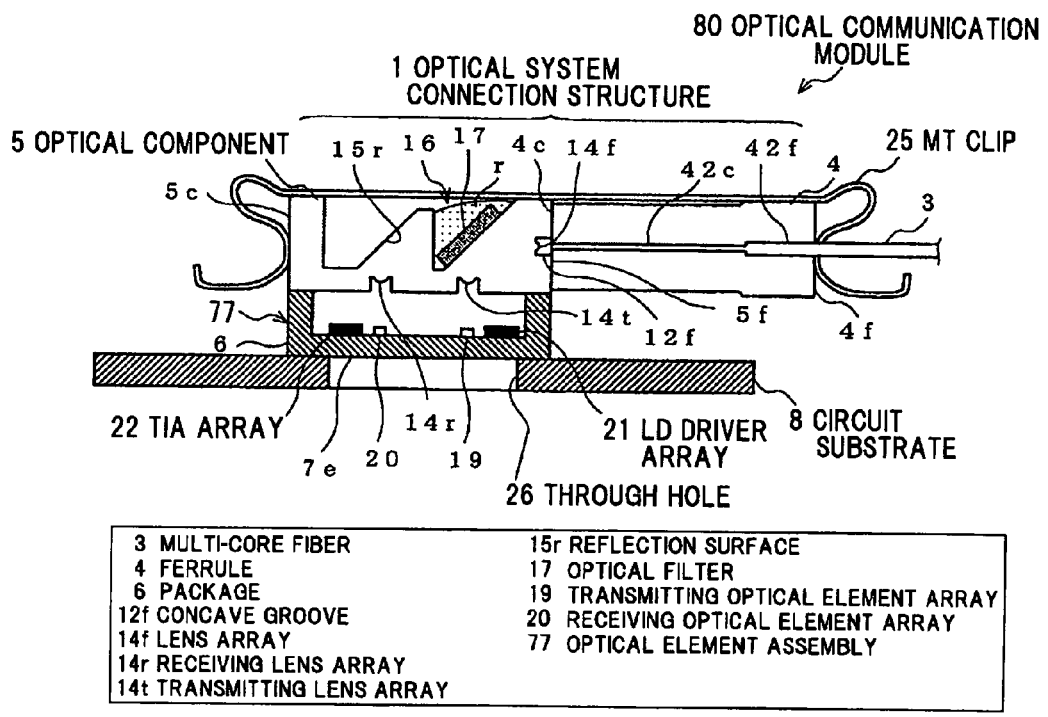
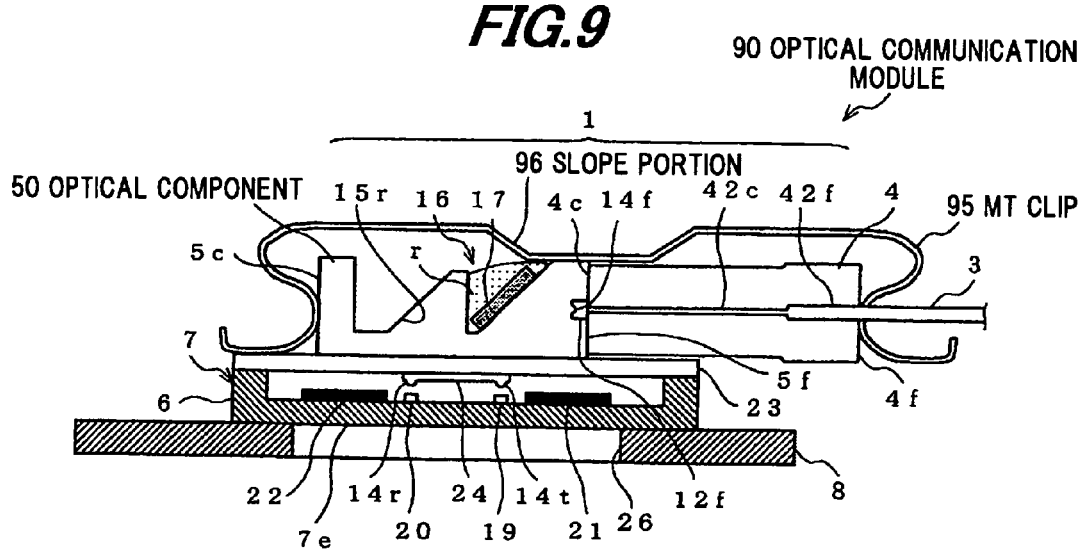

OPTICAL SYSTEM CONNECTION STRUCTURE, OPTICAL COMPONENT, AND OPTICAL COMMUNICATION MODULE

The present application is based on Japanese Patent Application No. 2007-066922 filed on Mar. 15, 2007, the entire contents of which are incorporated herein by reference.

BACKGROUND OF THE INVENTION

1. Field of the Invention

This invention relates to an optical system connection structure which optically connects an optical fiber inserted into a ferrule and an optical component, and to an optical communication module which connects a module converting an electrical signal to an optical signal and a module converting an optical signal to an electrical signal, and which transmits and receives an optical signal therein.

2. Description of the Related Art

In recent years, an optical interconnection has been broadly applied, which is a technology to transmit a signal at fast speed between an inside of a system apparatus and an apparatus or between optical modules. That is, the optical interconnection is a technology to treat an optical component as an electrical component, and to mount the optical component on a motherboard or a circuit substrate which is used, for example, for a personal computer, vehicle, and optical transceiver.

To increase a speed of a network signal, an optical communication module which is used for such an optical interconnection, uses an internal connection of a media converter or switching hub, an optical transceiver which transmits an Ethernet® signal having a gigabit class of transmission speed in a short distance, an inside of an apparatus (e.g., medical equipment, testing equipment, video system, and high-speed computer cluster), and a connection of components between apparatuses.

Accordingly, downsizing and lower cost are required for an optical communication module used in an infiniband which is a standard of a high-speed interface for a server, and research and development have been done so as to achieve such requirements.

A conventional optical communication module 111 as shown in FIG. 11 includes a photoelectric conversion module 113 disposed on a printed circuit board 112, an optical fiber cable connector portion 114 formed on an end of the photoelectric conversion module 113, and a housing 115 containing them. An electrical plug 116 is disposed at an end of the housing 115. The optical communication module 111 is used by connecting an optical fiber cable to the optical fiber cable connector portion 114.

The related arts of the invention are, for example, JP-A-2004-355894, and JP-A-2006-309113.

However, the conventional optical communication module 111 converts positive or negative (polarity) electrical signals having the same intensity, to optical signals, and transmits the optical signals to an optical fiber cable as an optical transmission line, or receives an optical signal from the optical fiber cable.

That is, the conventional optical communication module 111 either transmits or receives with respect to a single optical fiber. Therefore, when the optical communication module 111 is used in an infiniband which, as mentioned above, is a standard of a high-speed interface for a server, there are a lot of problems such that an entire module size increases, the number of components increases, and a price thereof increases.

In recent optical communication modules, a bi-directional communication type has become required, which can both transmit and receive by a single optical fiber at the same time. However, there has not been a product which achieves downsizing and yet keeps a high-speed transmission rate regardless of a multi-core fiber or a single-core fiber.

Further, although such optical communication modules generally include an optical system connection structure in which a ferrule connected to an optical fiber and an optical component are optically connected, a conventional optical system connection structure is difficult to collectively connect to a multi-core fiber.

SUMMARY OF THE INVENTION

In view of the foregoing and other exemplary problems, drawbacks, and disadvantages of the conventional methods and structures, an exemplary feature of the present invention is to provide an optical system connection structure which can achieve an easy assembly operation of a multi-core fiber in bi-directional communication.

(1) According to one exemplary aspect of the invention, an optical system connection structure includes:

a ferrule;

an optical fiber which is inserted into the ferrule;

an optical component which converts light paths of a first optical signal outputted from the optical fiber and a second optical signal which has a wavelength different from the first optical signal and is inputted into the optical fiber;

at least two inclined surfaces formed in the optical component, the inclined surfaces inclining with regard to a light axis of the optical fiber;

an optical filter which transmits or reflects the first optical signal, and which reflects or transmits the second optical signal, the optical filter being formed in one of the inclined surfaces;

a reflection surface which reflects the first optical signal or the second optical signal, the reflection surface being formed in one of the inclined surfaces; and a lens which is formed in a fiber side end face of the optical component facing the ferrule.

(2) According to another exemplary aspect of the invention, an optical component which converts light paths of a first optical signal outputted from an optical fiber inserted into a ferrule and a second optical signal which has a wavelength different from the first optical signal and is inputted into the optical fiber includes:

an engaging portion which is mechanically engaged with the ferrule;

at least two inclined surfaces inclining with regard to a light axis of the optical fiber;

an optical functional component which transmits or reflects the first optical signal or the second optical signal, the optical functional component being formed in one of the inclined surfaces;

a reflection surface which reflects the first and second optical signals, the reflection surface being formed in one of the inclined surfaces; and a lens which is formed in a fiber side end face of the optical component facing the ferrule.

(3) According to another exemplary aspect of the invention, an optical communication module includes:

a transmitting optical element array which transmits a plurality of optical signals;

a receiving optical element array which receives a plurality of optical signals;

an optical component which converts light paths of a transmitting light outputted from the transmitting optical element and a receiving light received by the receiving optical element array;

an optical element assembly in which the transmitting optical element array and the receiving optical element array are assembled in a package; and a circuit substrate which is connected to the optical element assembly.

(4) According to another exemplary aspect of the invention, an optical communication module includes:

a transmitting optical element array which transmits a plurality of optical signals;

a receiving optical element array which receives a plurality of optical signals;

an optical component which converts light paths of a transmitting light outputted from the transmitting optical element and a receiving light received by the receiving optical element array;

a driver which drives the transmitting optical element array;

an amplifier which amplifies each of outputs of the receiving optical element array;

a package in which the transmitting optical element array, the receiving optical element array, the driver, and the amplifier are mounted;

a glass substrate for sealing the package;

a transmitting lens array including a plurality of transmitting lenses which are formed so as to correspond to a pitch of the transmitting optical element array; and a receiving lens array including a plurality of receiving lenses which are formed so as to correspond to the pitch of a receiving optical element array, wherein the transmitting lens array and the receiving lens array are formed on a back surface of the glass substrate, and wherein an inner surface of the package and the back surface of the glass substrate are fixed.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2 is a detailed longitudinal sectional view of the optical communication module shown in FIG. 1A;

FIG. 3A is a side view of an optical element module;

FIG. 3B is a back view of the optical element module;

FIG. 3C is a plan view when the optical element module is mounted on a circuit substrate;

FIG. 8 is a longitudinal sectional view showing an example of an optical communication module according to the exemplary embodiment;

FIG. 9 is a longitudinal sectional view showing an example of an optical communication module using another exemplary MT clip;

DETAILED DESCRIPTION OF THE EXEMPLARY EMBODIMENTS

Figure 1A:
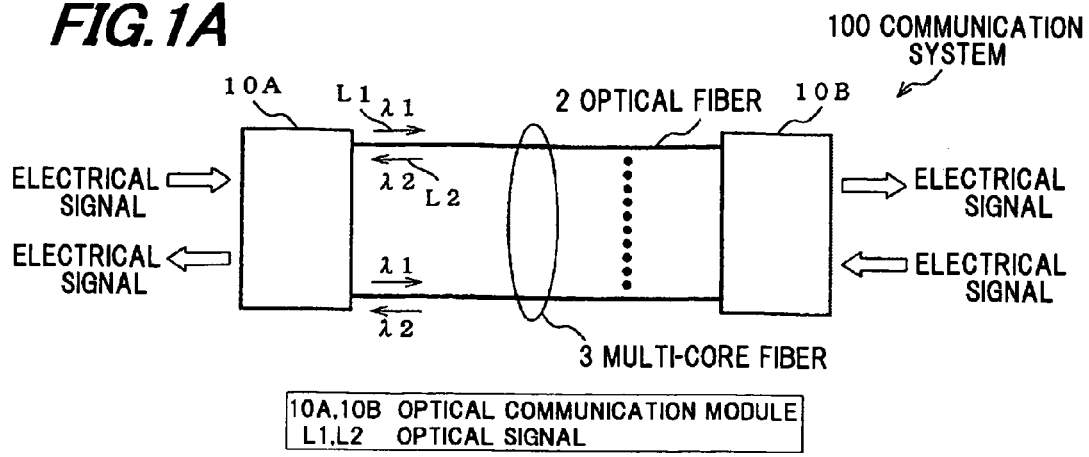
FIG. 1A is a schematic view showing a communication system using an optical communication module in an exemplary embodiment according to the present invention.

Referring now to the drawings, and more particularly to FIGS. 1A to 11, there are shown exemplary embodiments of the methods and structures according to the present invention.

Exemplary Embodiment

At first, a communication system using an optical communication module in an exemplary embodiment according to the present invention is described in FIG. 1A.

As shown in FIG. 1A, the communication system 100 includes optical communication modules (e.g., a multi-core bidirectional communication type optical communication module, active connector module) 10A and 10B (hereinafter, sometimes "optical communication module 10") according to the exemplary embodiment which convert an electrical signal into an optical signal or an optical signal into an electrical signal.

The communication system 100 also includes an optical fiber 2 to transmit optical signals having different wavelengths, and a multi-core fiber 3 in which a plurality of optical fibers 2 are disposed in parallel and which mutually connects the optical communication modules 10A and 10B. The communication system 100 converts an electrical signal into an optical signal, or an optical signal into an electrical signal, and transmits or receives such signal between the optical communication modules 10A and 10B.

In this exemplary embodiment, a multi-mode fiber (MMF) is used as the optical fiber 2, and a tape fiber in which twelve multi-mode fibers are disposed in parallel for twelve channels, is used as the multi-core fiber 3. As optical signals having different wavelengths which are transmitted in each optical fiber 2, an optical signal L1 having a wavelength $\lambda 1$ for the optical communication module 10A and an optical signal L2 having a wavelength $\lambda 2$ for the optical communication module 10A may be used. As a semiconductor laser (e.g., laser diode (LD)) which is used for a transmitting optical element as mentioned below, a vertical-cavity surface-emitting laser (VCSEL) which outputs a light of about an 850 nm wavelength may be used. Thereby, optical signals L1 and L2 which may have a wavelength interval of ±25 nm between the wavelength $\lambda 1$ and the wavelength $\lambda 2$ (e.g., the wavelength $\lambda 1$ is about 825 nm, the wavelength $\lambda 2$ is about 850 nm) can be used.

Figure 6:
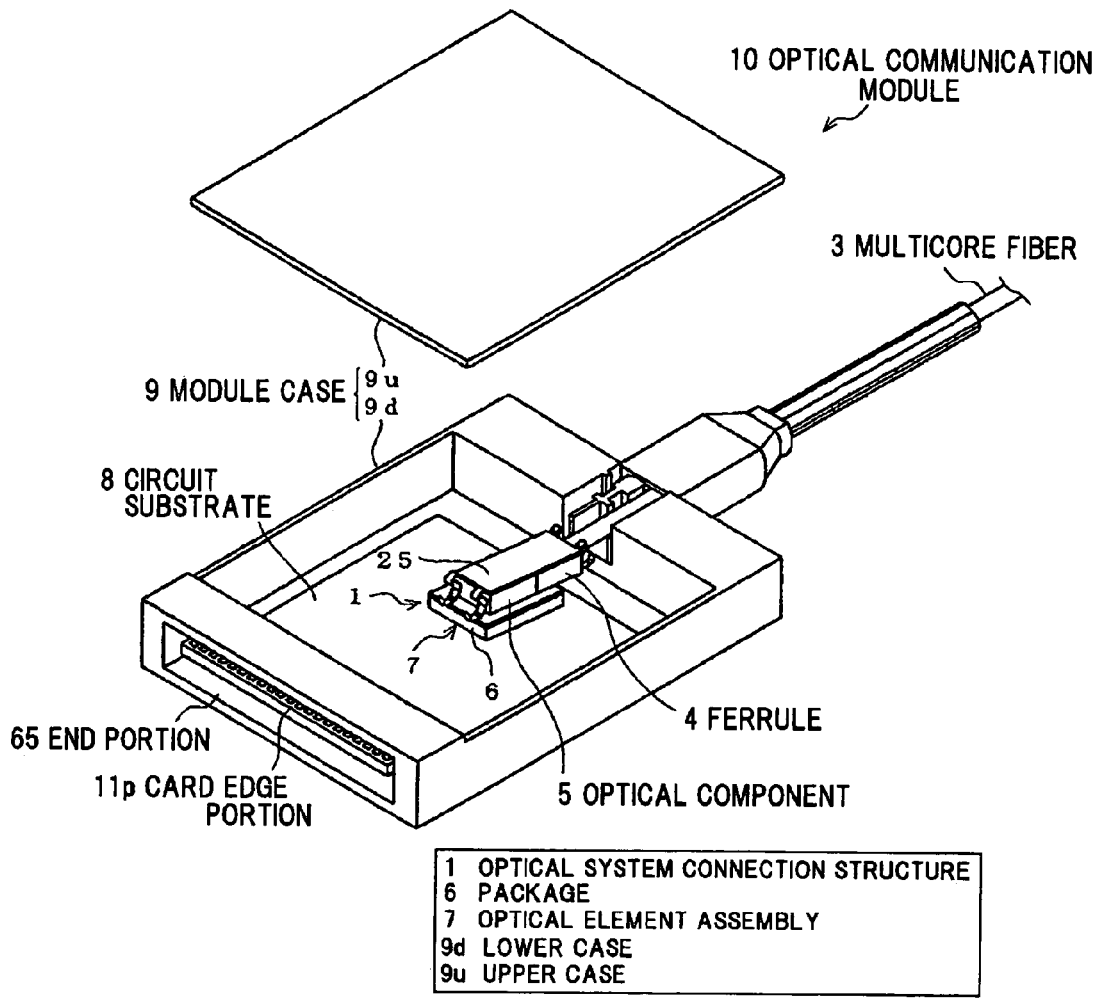
FIG. 6 is a perspective view showing an entire configuration of the optical communication module according to the exemplary embodiment.

Next, an entire configuration of the optical communication module 10 is described referring to FIG. 6.

As shown in FIG. 6, the optical communication module 10 includes the multi-core fiber 3, a ferrule 4, an optical component (i.e., an optical component for an optical communication module) 5, a package 6 made of ceramic, an optical element assembly 7 including a transmitting optical element and a receiving optical element being mounted in the package 6 and sealed, a circuit substrate (main substrate) 8 which electrically connects the transmitting optical element and the receiving optical element mounted on the optical element assembly 7, and a module case 9 having an opening in an end portion 65 (left lower end portion in FIG. 6).

In this case, an optically-connecting portion of the transmitting optical element, the receiving optical element, the multi-core fiber 3, the ferrule 4, and the optical component 5, constitute an optical system connection structure 1 according to this exemplary embodiment.

The other end portion of the multi-core fiber 3 (left end portion in FIG. 4) is inserted into the ferrule 4. In this exemplary embodiment, a mechanically transferable (MT) ferrule (which is available for collective connection of a multi-core fiber) is used as the ferrule 4.

The optical component 5 is mounted on the optical element assembly 7 located above the circuit substrate 8. The optical component 5 inputs an optical signal from a transmitting optical element into the optical fiber 2 which is inserted into the ferrule 4, or inputs an optical signal from the ferrule 4 into the optical fiber 2, and optically couples the optical element assembly 7 and the optical fiber 2.

That is, the optical component 5 transforms a light path of an optical signal L1 outputted from the optical fiber 2, and an optical signal L2 which has a wavelength different from an optical signal L1 and which is inputted to the optical fiber 2.

The other end portion of the circuit substrate 8 includes a substrate card edge portion, on both surfaces of which a plurality of connection terminals (not shown) are formed. The substrate card edge portion is electrically connected to an end portion of a connector component (not shown) disposed to another end of the module case 9. The other end portion of the connector component includes a card edge portion (e.g., plug) 11p for a connector which is made of a plurality of connection terminals on front and back surfaces thereof. The above-mentioned apparatus (e.g., media converter, high-speed computer, etc.) includes an adapter for engaging the card edge portion 11p, and the optical communication module 10 is pluggable thereto.

The module case 9 includes a lower case 9d having a box shape which has an opening in an upper portion thereof, and an upper case 9u having a plate shape for covering the opening. The module case 9 is formed of metal by using a material having a high heat radiation capability (e.g., Al, Zn, etc.). In the lower case 9d, the end portion of the multi-core fiber 3, the ferrule 4, the optical component 5, the optical element assembly 7, and the circuit substrate 8 are contained. The upper case 9u may be fixed to the lower case 9d by screws.

Figure 1B:
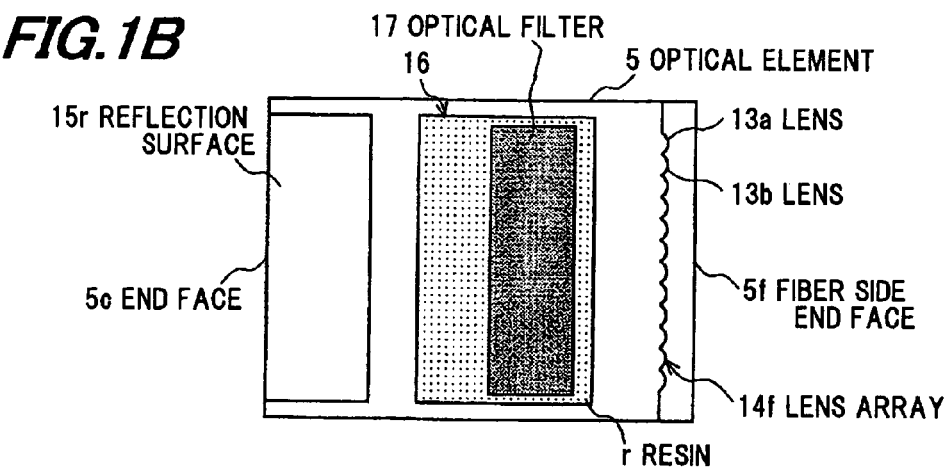
FIG. 1B is a schematic plan view showing a main portion of an optical system connection structure in the exemplary embodiment according to the present invention.

Next, an optical system connection structure 1 and the optical component 5 according to this exemplary embodiment are described. FIG. 1B is a schematic plan view showing a main portion of the optical system connection structure 1 according to this exemplary embodiment, and FIG. 1C is a longitudinal sectional view thereof.

Figure 1C:
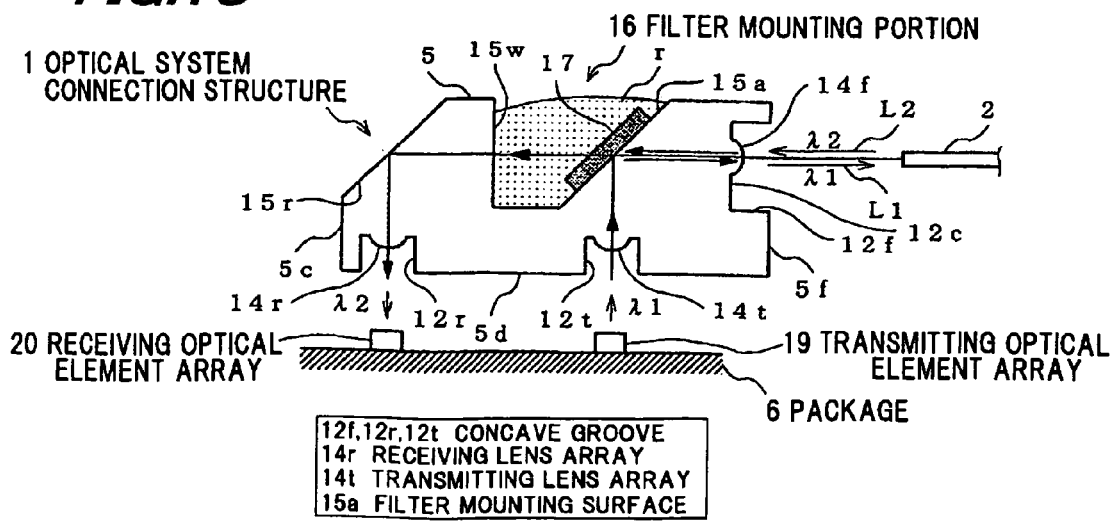
FIG. 1C is a longitudinal sectional view of the optical system connection structure in the exemplary embodiment according to the present invention.

As shown in FIGS. 1B and 1C, a face 5f (i.e., a fiber side end face, or a light input/output end face of a fiber side) is formed in a fiber side of the optical component 5, which faces the end face 5 of each optical fiber 2 included in the multi-core fiber 3.

In the fiber side end face 5f of the optical component 5, a concave groove 12f is formed as a fiber side groove, and in a bottom surface 12c of the concave groove 12f, a lens array 14f for a fiber is formed. The lens array 14f includes a plurality of lenses 13a, 13b, ..., which are optically connected to each optical fiber 2 of the multi-core fiber 3 and formed so as to correspond to a pitch thereof.

In the vicinity of the center of an upper portion of the optical component 5, a filter mounting portion 16 is formed in a concave shape (e.g., a trapezoidal shape in a longitudinal section), which has a filter mounting surface 15a which is one of at least two inclined surfaces inclining at about 45° with regard to a light axis of the optical fiber 2. In the filter mounting surface 15a, an optical filter 17 (e.g., a single optical fiber) is fixed by an adhesive as an optical functional component for reflecting an optical signal L1 for inputting to the optical fiber 2 inserted into the ferrule 4 (See FIG. 2), and for transmitting an optical signal L2 for outputting from the optical fiber 2 inserted into the ferrule 4.

The optical filter 17 reflects an optical signal having a predetermined wavelength band, and transmits an optical signal having another wavelength band. In this exemplary embodiment, as the optical filter 17, an optical filter made of a dielectric multilayer is used, so as to reflect an optical signal L1 having a wavelength of λ1 and to transmit an optical signal having a wavelength of λ2.

In the filter mounting portion 16 after mounting the optical filter 17, a resin r which is transparent to the optical signals L1 and L2 may be formed by potting so as to cover the optical filter 17, and preferably so as to fill the filter mounting portion 16.

As the transparent resin r, an ultraviolet (UV) curing resin or a heat hardening resin can be used. A material of the resin may be an epoxy type, an acrylic type, or a silicone type. The adhesive for fixing the optical filter 17 may be the same material.

As the inclined surface which inclines at about 45° with regard to a light axis of the optical fiber 2, a reflection surface 15r, which reflects an optical signal L2 outputted from the optical fiber 2 inserted into the ferrule 4 and transmitting the optical filter 17, is formed on the other end face 5c of the optical component 5.

The reflection surface 15r can totally reflect (e.g., reflect substantially more than 95%) the optical signal L2 by facing a material having a refraction index much different from that of the optical component 5, or a material having a reflectivity more than that of the optical component 5. Although in a structure of this exemplary embodiment, the reflection surface 15r abuts air as a material having a refraction index much different from that of the optical component 5, a metal mirror to which a metal (e.g., Au, etc.) is evaporated, may be used in addition to air.

In an upper portion of the package 6, an opening is formed. On an inside bottom surface facing the opening, a transmitting optical element array 19 in which a plurality of transmitting optical elements (e.g., an LD element) which output an optical signal L1 inputted into the optical component 5, are deposited in parallel (e.g., having an array pitch of about 250 μm), and a receiving optical element array 20 in which a plurality of receiving optical elements (e.g., photo diode (PD) elements) which receive an optical signal L2 inputted into the optical component 5 are deposited in parallel (e.g., having an array pitch of about 250 μm may be used), are mounted.

In this exemplary embodiment, based on the number of the optical fibers 2 constituting the multi-core fiber 3, a vertical cavity surface emitting laser (VCSEL) array including twelve LD elements may be used as the transmitting optical element array 19, and a PD array including twelve PD elements may be used as the receiving optical element array 20.

As an end face of the optical component 5 different from the end face 5f, in a lower surface 5d (i.e., an optical element side end face, or a light input/output end face of an optical element side), a concave groove 12t is formed as one of the optical element side grooves. In an inside upper surface of the concave groove 12*t*, a transmitting lens array 14*t* including a plurality of transmitting lenses (e.g., 12 lenses in this embodiment) that is formed so as to correspond to the array pitch of the transmitting optical element array 19, is formed.

Additionally, in the lower surface 5*d* of the optical component 5, a concave groove 12*r* is formed as another optical element side groove. In an inside upper surface of the concave groove 12*t*, a receiving lens array 14*r* including a plurality of receiving lenses (e.g., 12 lenses in this embodiment) that is formed so as to correspond to the array pitch of the receiving optical element array 20, is formed.

Each transmitting lens of the transmitting lens array 14*t* is formed so as to face each of the LD elements of the transmitting optical element array 19. Each receiving lens of the receiving lens array 14*r* is formed so as to face each of the PD elements of the receiving optical element array 20.

Regarding the optical component 5, by forming the lens arrays 14*t* and 14*r* in the inside upper surface of the concave grooves 12*t* and 12*r*, when for example, the optical components 5 are placed on a tray side-by-side during a manufacturing assembly process, a lens surface can be prevented from touching the tray. Therefore, the lens surface can be protected, and the optical component 5 can be easily handled and processed.

The optical component 5 is collectively made of an optical resin transparent to the optical signals L1 and L2 by a plastic injection molding. The optical resin used for a material may be an acrylic-based resin, a polycarbonate (PC) based resin, or a cyclo-olefin polymer (COP) based resin. Additionally, to increase a material strength or a heat resistance, a polyetherimide (PEI), which is a super engineering plastic, is suitable. Any of these optical resins can be used as the optical component 5 according to the exemplary embodiment. In this case, although a resin having a refraction index of about 1.45~1.65 can be used as an optical resin for a material of the optical component 5, it is unnecessary to limit the refraction index as long as a loss of an optical signal is small.

Next, the optical communication module 10 using the optical system connection structure 1, is described in more detail referring to FIG. 2 and FIGS. 3A to 3C.

As shown in FIG. 2, in an inside bottom surface of the package 6, an LD driver array 21 which drives each LD element of the transmitting optical element array 19, and a transimpedance amplifier (TIA) array 22 which performs as a preamplifier to amplify an electrical signal received from each PD element of the receiving optical element array 20, are also mounted. On an upper portion of the package 6, a glass substrate 23 to seal an inside of the package is placed. The glass substrate 23 and the package 6 are bonded and sealed by a resin. In this case, the glass substrate 23 and the package 6 are fixed so that an inner surface of the package 6 and a back surface of the glass substrate 23 will face each other.

In this case, an optical component 50, which is another exemplary embodiment of the optical component 5 of FIGS. 1B and 1C, is shown in FIG. 2. Regarding the optical component 50, the transmitting lens array 14*t* and the receiving lens array 14*r* are differently constructed from the optical component 50. In FIG. 2, the reflection surface 15*r* is formed on the other end portion of the optical component 50.

When the optical component 50 is used, an optical element side lens array 24 in which the transmitting lens array 14*t* and the receiving lens array 14*r* are integrally molded, is formed in a lower surface (back surface) of the glass substrate 23 directly above the transmitting optical element array 19 and the receiving optical element array 20. The optical element side lens array 24 is collectively formed by a plastic injection molding by using the same material as the optical component 50.

The end face 5*f* of the optical component 50 and the other end face (e.g., a ferrule-side light input/output face) 4*c* of the ferrule 4 are formed to be substantially flat so that a heightwise direction (up-and-down direction in FIG. 2) is substantially parallel to a normal direction of the light axis of the optical fiber 2. The end face 5*f* of the optical component 50 and the other end face 4*c* of the ferrule 4 are optically coupled by a butt-connection. Under this condition, the end face 5*f* of the optical component 50 and the other end face 4*c* of the ferrule 4 are held by an MT clip 25 which is placed from above, and the end face 5*f* of the optical component 50 and the other end face 4*c* of the ferrule 4 are integrally fixed.

Figure 7:
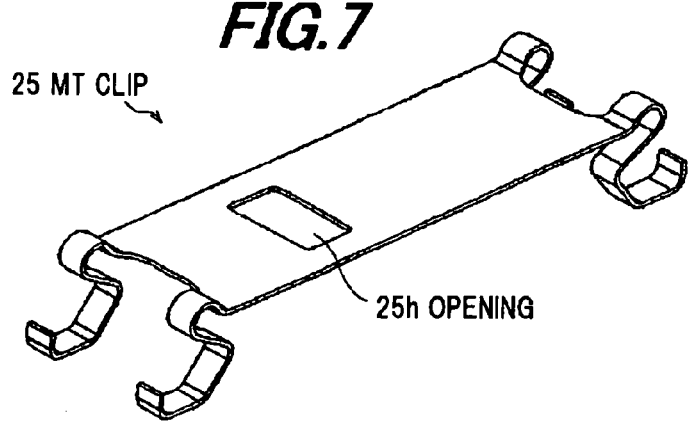
FIG. 7 is a perspective view showing an example of a mechanically transferable (MT) clip.
Figure 10:
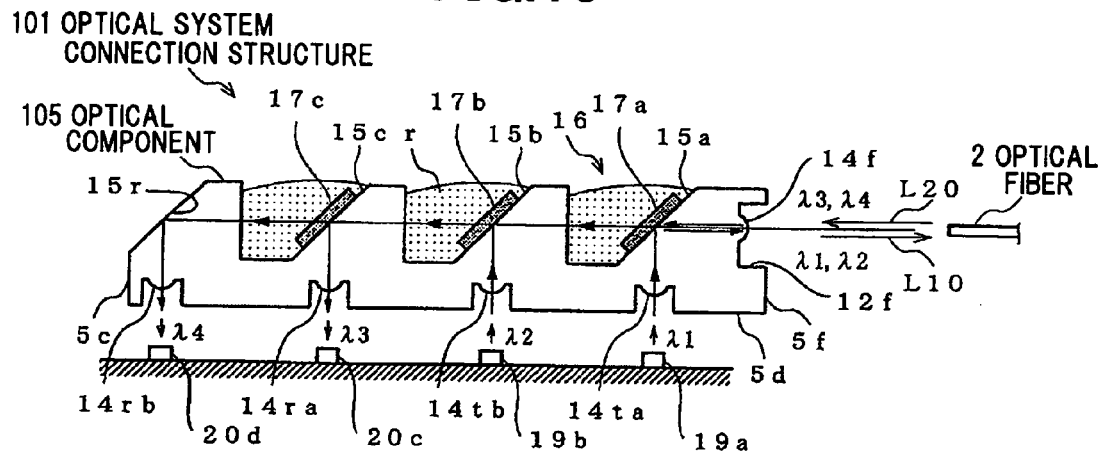
FIG. 10 is a longitudinal sectional view showing a main portion of another exemplary optical system connection structure according to the present invention.
Figure 11:
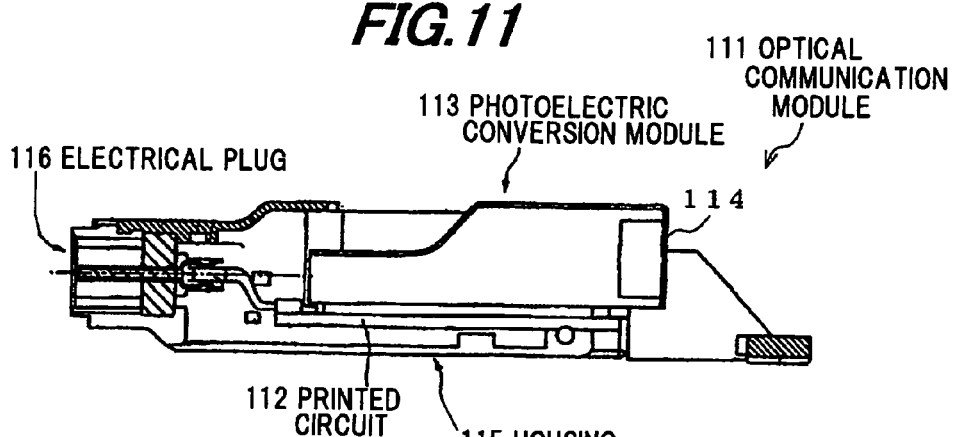
FIG. 11 is a longitudinal sectional view showing a conventional optical communication module.

In the MT clip 25, an opening 25*h* as a means for preventing a reflection light, as shown in FIG. 7, is exemplarily formed in a region that is located above the filter mounting portion 16. In this case, the means for preventing a reflection light is to prevent a reflection light (e.g., return light) from transmitting through the optical filter 17 out of optical signals outputted from the transmitting optical element array 19, from inputting into the transmitting optical element array 19 and the receiving optical element array 20.

Although a light of an optical signal, which is outputted from the transmitting optical element array 19 and has a wavelength of $\lambda 1$, may be substantially completely reflected (more than 95%) by the optical filter 17, a small amount of light of an optical signal which is not reflected by the optical filter 17 and may be transmitted, may be reflected by the MT clip 25 and may be returned to the optical filter 17.

If the opening 25*h* was not formed, then the return light, which has a wavelength of $\lambda 1$ and returns to the optical filter 17 again, would almost be reflected (more than 95%) by the optical filter 17 and would enter the receiving optical element array 20, and a remaining small amount of return light would transmit through the optical filter 17 and return to the transmitting optical element array 19. The return light, which has a wavelength of $\lambda 1$ and would return to the receiving optical element array 20, would be noise to an optical signal L2 which has a wavelength $\lambda 2$ and is properly received by the receiving optical element array 20.

Further, the return light returning to the transmitting optical element array 19 would make an oscillator operation of the transmitting optical element array 19 unstable. Therefore, the return light is not preferable since it decreases signal quality.

Consequently, as shown in FIG. 7, since by forming the opening 25*h* in the MT clip 25, a small amount of light of an optical signal which has a wavelength of $\lambda 1$ and transmits in the optical filter 17 without reflection, can be released to the outside, an operation of the transmitting optical element array 19 and the receiving optical element array 20 can be stable. By the same token, depending on a performance of the optical filter 17 (e.g., a reflectance of substantially more than 99%), it may be unnecessary to form the opening 25*h* in the MT clip 25.

Additionally, as another exemplary modification of the MT clip 25 of FIG. 7, an MT clip 95 shown in FIG. 9 can be used. In the MT clip 95, a slope portion 96 is formed as a means for preventing a reflection light in a region that is located above the filter mounting portion 16. In this case, in a flat portion of the MT clip 25, a concave portion is formed in a substantially trapezoidal shape in a side view, and one of the slope portions of the concave portion is used as the slope portion 96 in the MT clip 95.

In the optical communication module 90 using the MT clip 95, an optical signal, which is outputted from the transmitting optical element array 19 and transmits to the optical filter 17, is reflected to another light path and does not return to the former light path, even if the optical signal is reflected at the slope portion 96. Thus, an operation of the transmitting optical element array 19 and the receiving optical element array 20 can be stable.

As shown in FIG. 2, the transmitting optical element array 19, the receiving optical element array 20, the LD driver array 21, and the TIA array 22 are contained and assembled in the package 6 made of ceramic, and the optical element side lens array 24 is fixed to a lower surface of the glass substrate 23 by an adhesive.

Next, the glass substrate 23 is placed on the package 6 so that the optical element side lens array 24 will be assembled in the package 6, the package 6 and the glass substrate 23 is sealed by a resin, and the optical element assembly 7 is obtained. An outside diameter of the optical element assembly is about 1 cm×1 cm. The optical element assembly 7 and the optical component 50 constitute an optical transmitting-receiving assembly (optical sub-assembly (OSA)).

Next, as shown in FIGS. 3A and 3B, on a lower surface (back surface) of the package 6, a plurality of solder balls 31 for mounting the optical element assembly 7 on the circuit substrate 8 is disposed in a lattice pattern.

That is, the package 6 constitutes a ball grid array (BGA) solder. A part of the plural solder balls 31 is set to a package ground, and the package ground and a substrate ground formed on the circuit substrate 8 are electrically connected.

In FIG. 2, as a method to assemble the optical element assembly 7 on the circuit substrate 8, the lower surface of the package 6 and the circuit substrate 8 may be bonded by a conductive adhesive, other than a method using the BGA solder.

When the lower surface of the package 6 and the circuit substrate 8 are bonded by a conductive adhesive, each channel between the package 6 and the circuit substrate 8 is electrically connected by wire-bonding in order to electrically transmit a signal of each channel between the package 6 and the circuit substrate 8. Therefore, a region (not shown) for the wire bonding is formed in a part of the package 6.

Additionally, in an optical element module mounting portion 7e of the circuit substrate 8 above which the package 6 is located, a through hole 26 for radiation, which makes a part of the lower surface of the package 6 exposed, is formed.

Exemplarily, a heat-conductive material is filled or disposed in the through hole 26 in order to increase a heat conductivity. The heat-conductive material may be a heat transfer sheet made of a silicone resin, a carbon material, or a metal material having a good heat conductivity.

Figure 4:
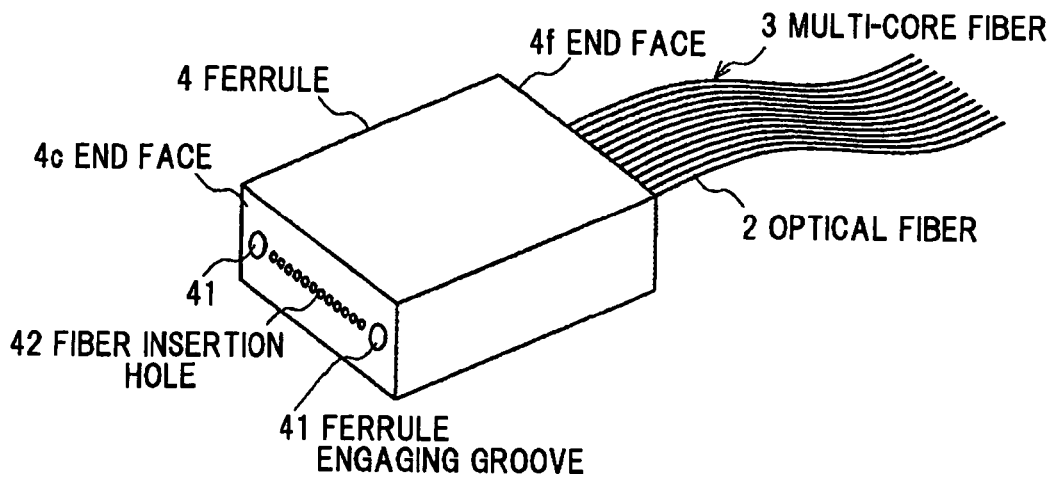
FIG. 4 is a perspective view showing a connection status of a ferrule of the optical communication module shown in FIG. 1A and a tape fiber.
Figure 5:
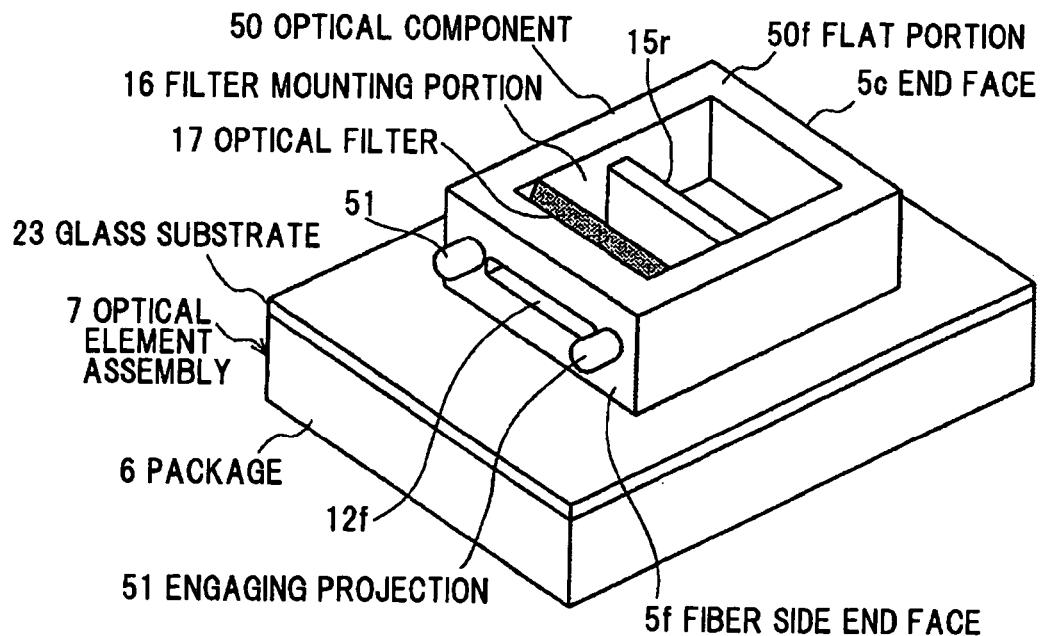
FIG. 5 is a perspective view showing an optical component and an optical element assembly in FIG. 1A.

Next, the ferrule 4 and the optical component 50 are described referring to FIG. 4 and FIG. 5, respectively.

As shown in FIG. 4, the ferrule 4 is formed in a substantially rectangular shape in whole, and ferrule engaging grooves 41 are formed as an engaged portion for mechanically engaging with the optical component 50 in both sides of the end face 4c. Between the ferrule engaging grooves 41, a plurality of fiber insertion holes 42 (twelve holes in FIG. 4), which are pierced along a longitudinal direction of the ferrule 4 from the end face 4c to the other end face 4f, are formed in parallel. Each of the fiber insertion holes 42 is formed in the same array pitch as each of the lenses 13a, 13b, . . . of the lens array 14f for a fiber, so as to face each of the lenses 13a, 13b, . . . .

As shown in FIG. 2, the fiber insertion hole 42 includes a large-diameter containing portion 42f which is formed in one end face of the ferrule 4 and in which the multi-core fiber 3 without removal of a covering is contained. A small-diameter containing portion 42c is formed in another end face of the ferrule 4 and in which each of optical fibers 2 with removal of a covering is contained.

To place the multi-core fiber 3 into the ferrule 4, at first, a part of a covering of the multi-core fiber 3 is removed, each of the optical fibers 2 is separated, and then a perpendicular cut surface is formed by cutting an end face of each of the optical fibers 2.

Thereafter, the multi-core fiber 3 is inserted into the fiber insertion hole 42 until each perpendicular cut surface of the optical fibers 2 reaches the end face 4c of the ferrule 4, and fixed to the ferrule 4 by a resin. In this case, the optical fiber 2 can protrude somewhat (e.g., 0.2 mm) from the end face 4c or withdraw somewhat into the ferrule 4.

That is, a length of each of the optical fibers 2 protruding from the end face 4c of the ferrule 4 is exemplarily within a range that the optical fibers 2 do not touch the lens array 14f for a fiber shown in FIG. 1C, and an optical coupling loss is within a desired value. Further, a length from the end face 4c of the ferrule 4 to the end face of each optical fiber 2 withdrawn into the ferrule 4 is exemplarily within a range that an optical coupling loss is within a desired value.

After each of the optical fibers 2 is separated, each end face is inserted into the fiber insertion hole 42, and then a perpendicular cut surface may be formed by cutting an end face of each of the optical fibers 2 protruding from the fiber insertion hole 42.

As shown in FIG. 5, an outline of the optical component 50 is formed in the same shape as the ferrule 4, and in the end face 5f thereof, engaging projections 51 are formed as an engaging portion that mechanically engages the ferrule engaging grooves 41 (See FIG. 4).

A coupling portion (e.g., connecting portion) is constituted, where the engaging projections 51 and the ferrule engaging grooves 41 engage each other, and where the engaging projections 51 and the ferrule engaging grooves 41 are engaged. Thereby, the end face 5f of the optical component 50 and the end face 4c of the ferrule 4 are butt-connected, and each of optical fibers 2 and the optical components 50 is optically connected.

Alternatively, an engaging groove as an engaging portion may be formed in the optical component 50, and an engaging projection as an engaged portion may be formed in the ferrule 4.

An upper edge of the optical component 50 includes a square-frame flat portion 50f to be grasped by a collet chuck of a mounter for mounting an optical component or an electric parts.

Next, an operation of this exemplary embodiment is described.

In the optical communication module 10 shown in FIG. 2, a plurality of (e.g., twelve) electrical signals for each channel from the circuit substrate 8 are converted to optical signals L1 having a wavelength of λ1 by the transmitting optical element array 19. Each of the optical signals L1 is converted to a collimated light by the transmitting lens array 14t of the optical element side lens array 24 (in case of the optical component 5, by the transmission lens array 14t of the optical component 5) and inputted to the optical component 50. Thereafter, each of the optical signals L1 is reflected at the optical filter 17, collected by the lens array 14f for a fiber, and outputted from the optical component 50. Then, each of the optical signals L1 is inputted to each of the optical fibers 2 of the multi-core fiber 3, and transmitted to another optical communication module.

Further, twelve optical signals L2 for each channel, which has a wavelength of λ2 and is transmitted from another optical communication module, are outputted from each of the optical fibers 2 of the multi-core fiber 3, converted to a collimated light by the transmission lens array 14f of the optical component 50, and inputted to the optical component 50. Then, the optical signals L2 are transmitted through the optical filter 17, reflected at the reflection surface 14r, and outputted from the optical component 50.

Then, each of the optical signals L2 is collected by the receiving lens array 14r, converted to twelve electrical signals for each channel by the receiving optical element array 20, and transmitted to circuit substrate 8, and then each of the optical signals L2 from another optical communication module is received.

The optical system connection structure 1 includes the light input/output end faces 4c and 5f of the ferrule 4 and the optical component 50 having a flat structure, each of the optical fibers 2 and the optical component 50 are optically coupled by butt-connecting the ferrule 4 and the optical component 50 in the engaging portion constituted by the light input/output end faces 4c and 5f.

Further, the optical system connection structure 1 may use an MMF as the optical fiber 2 inserted into the ferrule 4 which is easy to optically connect, and the lens array 14f for a fiber is formed in concave groove 12f of the optical component 50.

Thereby, in the optical system connection structure 1, since optical signals L1 and L2 outputted from the lens array 14f are transmitted through the concave groove 12f as a space, and coupled with each of the optical fibers 2, only perpendicularly cutting an end face of each optical fiber 2 is necessary. Thus, a complex and troublesome process of an end face (e.g., physical contact polishing) is unnecessary, and an assembly is easy.

Further, in the optical system connection structure 1, the VCSEL array, which can stand a return light occurring from an end face reflection of the optical fiber 2, is used as the transmitting optical element array 19. In this light, a complex and troublesome end face processing is unnecessary, and an assembly is easy.

Accordingly, when the optical system connection structure 1 is used, in addition to an optical communication module which performs a bi-directional optical communication at the same time by a single optical fiber 2, an assembly of the optical communication module 10 having a high-speed transmission rate by making it multi-core, becomes easy.

The optical communication module 10 having the optical system connection structure 1 uses the multi-core fiber 3 in order to receive or transmit a set of optical signals L1 and L2 having a wavelength of λ1 and λ2 by a single optical fiber 2, and the optical component 50 in order to collectively communicate the optical signals L1 and L2 from the multi-core fiber 3 in a bi-directional manner.

Since a main part of the optical communication module 10 can be constituted by forming the lens array 14f, the filter mounting portion 16, and the reflection surface 15r in the optical component 50, and by mounting the optical filter 17 on the filter mounting portion 16, a configuration is simple in comparison to a conventional optical communication module. Additionally, since it is possible to communicate in a bi-directional manner, the number of cores of the optical fibers 2 can be decreased in half in comparison to a one-way communication. Thus, a small and inexpensive optical communication module can be achieved.

Further, the optical element side lens array 24 is mounted on a back surface of the glass substrate 23 of the optical element assembly 7, and the optical component 50, and the transmitting lens array 14t and the receiving lens array 14r that are micro lens arrays having a short focal distance, are formed separately. Thereby, a misalignment of a light axis can be alleviated, and the optical communication module 10 can achieve a low loss and a high reliability.

In this case, a thermal expansion of the optical component 5 made of a resin is large (e.g., a coefficient of thermal expansion may be 60 ppm/° C.), and a thermal expansion of the package 6 made of a ceramic is small (e.g., a coefficient of thermal expansion may be 7 ppm/° C.).

Further, in a structure that the optical component 5, the transmitting lens array 14t, and the receiving lens array 14r are incorporated as shown in FIG. 1C, when the optical component 5 is assembled on the package 6, a part of the optical component 5 is connected and fixed to an upper edge of the package 6 (See FIG. 8).

Therefore, when the optical component 5 is thermally expanded by a temperature change, even with trying to control the thermal expansion of the optical component 5 having a large thermal expansion by the package 6 having a small thermal expansion, an effect to control the thermal expansion of the optical component 5 is small.

On the other hand, in a structure as shown in FIG. 2 that the optical component 5, the transmitting lens array 14t, and the receiving lens array 14r are separated, an entire surface of the optical element side lens array 24 in an opposite side of a lens surface thereof is bonded to the glass substrate 23 having a small thermal expansion (e.g., a coefficient of thermal expansion may be 7 ppm/° C.).

Thereby, in the optical communication module 10, since the entire optical element side lens array 24 is strongly bonded to the glass substrate 8, even though the optical element side lens array 24 tries to expand by heat, the thermal expansion of optical element side lens array 24 can be controlled by the glass substrate 8 having a small thermal expansion.

In the optical communication module 10, since an upper edge of the package 6 where the transmitting optical element array 19 and the receiving optical element array 20 are mounted, and glass substrate 23 are sealed by a resin, an area of the resin exposed to air is extremely small. Therefore, moisture permeation into the package 6 from the air can be decreased, and a reliability of an optical element or an electrical device in the package 6 can be increased.

Additionally, in the optical communication module 10, since the optical filter 17 is mounted on the filter mounting portion 16, and since the resin r, which is transparent to the optical signals L1 and L2, is disposed so as to cover the optical filter 17, a connecting part of the filter mounting surface 15a and the optical filter 17 can be reinforced, and a degradation of the optical filter 17 occurring from a moisture in the air can be reduced.

Further, an unnecessary reflection of the optical signal L2 from the back surface of the optical filter 17 can be prevented.

Further, by inclining a surface 15w facing the filter mounting surface 15a with respect to a direction perpendicular to the light axis of the optical fiber 2, even if the resin r filled in the filter mounting portion 16 is separated from the surface 15w facing the filter mounting surface 15a, a return light reflected from the surface 15w facing the filter mounting surface 15a can be reduced.

The upper edge of the optical component 50 includes the flat portion 50f. A section of a general collet chuck has a reversed funnel shape (e.g., triangular shape in a sectional view), or a lower surface thereof is flat. Since the upper edge of the optical component 50 is the flat portion 50f, the optical component 50 can be easily assembled by grasping with the collet chuck, where the collet chuck is controlled to approach to the optical component 50 from above and exert a vacuum pressure thereto.

In the exemplary embodiment, although the optical communication module 10 is described, in which the transmitting lens array 14t and the receiving lens array 14r are formed separately from the optical component 50 and the optical component 50 is used, an optical communication module 80 as shown in FIG. 8 can use the optical component 5 of FIG. 1C in which the transmitting lens array 14t and the receiving lens array 14r are formed integrally.

In the optical communication module 80, a circumferential edge of the flat lower surface of the optical component S and the upper edge of the package 6 are connected by a resin, and optical element assembly 77 sealed by a resin is formed.

In this exemplary embodiment, although the optical filter 17 which reflects an optical signal L1 having a wavelength λ1 and transmits an optical signal L2 having a wavelength λ2 is used, an optical filter which transmits an optical signal L1 having a wavelength λ1 and reflects an optical signal L2 having a wavelength λ2 can be used. In this case, a structure of the optical components 5 and 50 are not changed, and it is necessary only to change a disposition of the transmitting optical element array 19 and the receiving optical element array 20.

In the communication system 100 shown in FIG. 1A, when the optical communication module 10A includes the optical filter 17 which reflects an optical signal L1 having a wavelength λ1 and transmits an optical signal L2 having a wavelength λ2, as shown in FIG. 1C, the optical communication module 10B includes the optical filter 17 which transmits an optical signal L1 having a wavelength λ1 and reflects an optical signal L2 having a wavelength λ2, the transmitting optical element array 19 outputs the optical signal L2 having a wavelength λ2 and the receiving optical element array 20 receives the optical signal L1 having a wavelength λ1.

Since a pair of the optical communication modules 10A and 10B, in which a wavelength characteristic as to a transmission and a reflection of the optical filter 17 is changed, are used without changing a disposition of a transmitting optical element and a receiving optical element, a configuration of a circuit system for driving the optical communication modules 10A and 10B can be shared, and a system construction can become simple.

Additionally, in the above exemplary embodiment, although exemplary communicating optical signals L1 and L2 having a wavelength of λ1 and λ2 in bi-directional communication by a multi-core fiber is described, optical signals having different wavelengths equal to or more than three can be used. In this case, since plural optical filters are needed, a configuration of the optical components 5 and 50 is arbitrarily changed according thereto.

For example, as an optical system connection structure 101 which is another example of the optical system connection structure 1 of FIG. 1C, a long optical component 105 is formed along a longitudinal direction of the optical fiber 2. Three of four inclined surfaces are set as filter mounting surfaces 15a-15c in order from a fiber side, and the remaining inclined surface is set as a reflection surface 15r. Four concave grooves are formed in a lower surface 5d, and two transmitting lens arrays 14ta and 14tb and two receiving lens arrays 14ra and 14rb are formed corresponding to the concave grooves.

An optical filter 17a which reflects an optical signal having a wavelength λ1 and transmits an optical signal having another wavelength, is mounted on the filter mounting portion 15a, an optical filter 17b which reflects an optical signal having a wavelength λ2 and transmits an optical signal having another wavelength, is mounted on the filter mounting portion 15b, and an optical filter 17c which reflects an optical signal having a wavelength λ3 and transmits an optical signal having another wavelength, is mounted on the filter mounting portion 15c.

Under the optical component 105, a transmitting optical element array 19a outputting an optical signal having a wavelength λ1, a transmitting optical element array 19b outputting an optical signal having a wavelength λ2, and receiving optical element arrays 20c and 20d are disposed in order from a fiber side, respectively.

The optical system connection structure 101 is an example using optical signals having different wavelengths (e.g., λ1 to λ4) for a transmission between modules. In the optical system connection structure 101, as to transmitting, optical signals having wavelengths of λ1 and λ2 which are outputted from the transmitting optical element arrays 19a and 19b, are multiplexed in wavelength, and the wavelength-multiplexed optical signals L10 (corresponding to the foregoing optical signal L1) are inputted to each of optical fibers 2.

Further, as to receiving, the wavelength-multiplexed optical signals L20 (corresponding to the foregoing optical signal L2) having wavelengths of λ3+λ4 which are outputted from each of the optical fibers 2, are demultiplexed in wavelength and received by the receiving optical element arrays 20c and 20d.

According to the optical system connection structure 101, a total transmission rate of optical signals can be faster than that of the optical system connection structure 1 of FIG. 1C.

Although in the exemplary embodiment of the FIG. 1C, the optical filter 17 which transmits or reflects an optical signal depending on a wavelength, is used as an optical functional component, a half mirror can be used instead of the optical filter 17. Although the half mirror does not have a wavelength selecting function to split or couple optical signals depending on a wavelength, a transmittance and a reflectance of an optical signal having a predetermined wavelength can be set arbitrarily.

An optical component using the half mirror has the same configuration as the optical component 5 of FIG. 1C except a replacement of the optical filter 17 with the half mirror. Therefore, for convenience, a function thereof is described by using FIG. 1C.

X % of an optical signal L1 having a wavelength of λ1 which is outputted from the transmitting optical element array 19, is reflected by the half mirror, optically connected to each of the optical fibers 2 by the lens array 14f, propagates in each of the optical fibers 2, and is transmitted to another optical communication module.

Regarding (100−x) % of the optical signal L1 which is not reflected by the half mirror and transmits the half mirror, a light amount of the optical signal L1 is monitored by a monitoring light-receiving element (not shown) which is disposed above the half mirror. Thereby, an emission of the transmitting optical element array 19 can be controlled.

Next, (100−x) of an optical signal L1 having a wavelength of λ1 which is transmitted from another optical communication module, transmits in the half mirror, is substantially totally reflected at the reflection surface 15r, and received by the receiving optical element array 20.

In this case, the optical signal L1 having a wavelength of λ1 which is transmitted from another optical communication module, is not reflected by the half mirror, transmits to the half mirror, and is inputted to the transmitting optical element array 19. Therefore, it is necessary to reduce a light amount inputting to the transmitting optical element array 19 by setting X to about 10%.

However, since a transmission coefficient of an optical signal outputted from the transmitting optical element array 19 and inputted to the receiving optical element array of another optical communication module, is expressed by an expression of X x (100–X), when X is 10%, a transmission coefficient is 9%. Thus, a loss is large in comparison to almost 100% (in more detail, about 95% x about 95%=90% or more) in a case that a wavelength filter is used.

However, the optical communication module according to this exemplary embodiment has a structure that a transmitting side and a receiving side are incorporated through the optical fiber 2, a precise alignment or a limitation of an optical output is unnecessary unlike a conventional optical communication module which has an optical connector opening portion for connecting to another arbitrary optical communication module. Therefore, even if a loss is large, a level of an optical output can be set arbitrarily by a manufacturer of the optical communication module as long as communication can be performed without errors.

In this case, when another optical communication module transmits an optical signal L1 having a wavelength of $\lambda 1$, the transmitting optical element array 19 can be kept in an operation stop status or a waiting status.

Further, a communication system using an optical communication module having a half mirror is different from the communication system 100 of FIG. 1A only in respect that another optical communication module also uses an optical signal having a wavelength of $\lambda 1$, and is the same in respect to other operations.

In this case, as mentioned above, when another optical communication module transmits an optical signal L1 having a wavelength of $\lambda 1$, the transmitting optical element array 19 may be kept in an operation stop status or a waiting status in order to avoid a collision of the optical signal L1.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

It is noted that Applicant's intent is to encompass equivalents of all claim elements, even if amended later during prosecution.

What is claimed is:

1. An optical communication module, comprising:
a transmitting optical element array which transmits a plurality of optical signals;
a receiving optical element array which receives a plurality of optical signals;
an optical component which converts light paths of a transmitting light outputted from said transmitting optical element and a receiving light received by said receiving optical element array;
an optical element assembly in which said transmitting optical element array and said receiving optical element array are assembled in a package;
a circuit substrate which is connected to said optical element assembly;
an optical fiber, the optical signals being inputted to said optical fiber and being outputted from said optical fiber;
at least two inclined surfaces inclining with regard to a light axis of said optical fiber;
an optical functional component which transmits or reflects the optical signals depending on a wavelength, said optical functional component being formed in one of said inclined surfaces;
a reflection surface which reflects the optical signs, said reflection surface being formed in one of said inclined surfaces; and
a lens which is formed in a fiber side end face of said optical component,
wherein
wherein
said optical fiber is inserted in a ferrule,
said optical component and the ferrule are optically coupled by butt-connecting and integrally fixed by placing a mechanically transferable (MT) clip from above; and
the MT clip comprises means for preventing a reflection light of the optical signals transmitting from said optical functional component from inputting into said transmitting optical element array or said receiving optical element array.

2. An optical communication module, comprising:
a transmitting optical element array which transmits a plurality of optical signals;
a receiving optical element array which receives a plurality of optical signals;
an optical component which converts light paths of a transmitting light outputted from said transmitting optical element and a receiving light received by said receiving optical element array;
a driver which drives said transmitting optical element array;
an amplifier which amplifies each of outputs of said receiving optical element array;
a package in which said transmitting optical element array, said receiving optical element array, said driver, and said amplifier are mounted;
a glass substrate for sealing said package;
a transmitting lens array comprising a plurality of transmitting lenses which are formed so as to correspond to a pitch of said transmitting optical element array; and
a receiving lens array comprising a plurality of receiving lenses which are formed so as to correspond to said pitch of a receiving optical element array,
wherein said transmitting lens array and said receiving lens array are formed on a back surface of said glass substrate, and
wherein an inner surface of said package and the back surface of said glass substrate are fixed.

3. The optical communication module according to claim 2, further comprising:
an optical fiber, the optical signals being inputted to said optical fiber and being outputted from said optical fiber;
at least two inclined surfaces inclining with regard to a light axis of said optical fiber;
an optical functional component which transmits or reflects the optical signals depending on a wavelength, said optical functional component being formed in one of said inclined surfaces;
a reflection surface which reflects the optical signals, said reflection surface being formed in one of said inclined surfaces; and
a lens which is formed in a fiber side end face of said optical component.

4. The optical communication module according to claim 2, further comprising:

a package ground which is formed on a back surface of the package and electrically connected to a substrate ground formed on said circuit substrate.

5. The optical communication module according to claim 3, wherein:
said optical fiber is inserted in a ferrule,
said optical component and the ferrule are optically coupled by butt-connecting and integrally fixed by placing a mechanically transferable (MT) clip from above; and
the MT clip comprises means for preventing a reflection light of the optical signals.

6. An optical communication module, comprising:
a transmitting optical element array which transmits a plurality of optical signals;
a receiving optical element array which receives a plurality of optical signals;
an optical component which converts light paths of a transmitting light outputted from said transmitting optical element and a receiving light received by said receiving optical element array;
a driver which drives said transmitting optical element array;
an amplifier which amplifies each of outputs of said receiving optical element array;
a package in which said transmitting optical element array, said receiving optical element array, said driver, and said amplifier are mounted;
a glass substrate;
a transmitting lens array comprising a plurality of transmitting lenses which are formed so as to correspond to a pitch of said transmitting optical element array; and
a receiving lens array comprising a plurality of receiving lenses which are formed so as to correspond to said pitch of a receiving optical element array,
wherein said transmitting lens array and said receiving lens array are formed on a back surface of said glass substrate, and
wherein an inner surface of said package and the back surface of said glass substrate are fixed.

* * * * *